US008880271B2

United States Patent
Jeon

(10) Patent No.: US 8,880,271 B2
(45) Date of Patent: Nov. 4, 2014

(54) ROBOT CLEANER AND METHOD FOR CONTROLLING THE SAME

(75) Inventor: Hyeongshin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 13/508,961

(22) PCT Filed: Nov. 16, 2010

(86) PCT No.: PCT/KR2010/008097
§ 371 (c)(1),
(2), (4) Date: May 9, 2012

(87) PCT Pub. No.: WO2011/059295
PCT Pub. Date: May 19, 2011

(65) Prior Publication Data
US 2012/0232738 A1    Sep. 13, 2012

(30) Foreign Application Priority Data

Nov. 16, 2009    (KR) .......................... 10-2009-0110433

(51) Int. Cl.
*G01C 22/00* (2006.01)
*G05D 1/02* (2006.01)
*A47L 9/00* (2006.01)

(52) U.S. Cl.
CPC ............. *A47L 9/009* (2013.01); *A47L 2201/04* (2013.01); *G05D 1/0274* (2013.01); *G05D 1/0255* (2013.01); *G05D 1/0219* (2013.01); *G05D 2201/0203* (2013.01)
USPC ............. 701/25; 700/245; 700/252; 700/255; 700/258; 180/167; 164/18; 382/153

(58) Field of Classification Search
USPC ................... 700/245, 252, 255, 258; 180/167; 164/18; 382/153
See application file for complete search history.

(56) References Cited

U.S. PATENT DOCUMENTS

| | | | | |
|---|---|---|---|---|
| 2002/0153185 A1* | 10/2002 | Song et al. | ..................... | 180/167 |
| 2004/0156541 A1* | 8/2004 | Jeon et al. | ..................... | 382/153 |
| 2004/0158357 A1* | 8/2004 | Lee et al. | ...................... | 700/258 |
| 2006/0025887 A1* | 2/2006 | Park | .............................. | 700/245 |
| 2006/0237158 A1* | 10/2006 | Shim et al. | ...................... | 164/18 |
| 2008/0249661 A1* | 10/2008 | Hong et al. | ................... | 700/252 |
| 2009/0281661 A1* | 11/2009 | Dooley et al. | ................. | 700/258 |
| 2011/0153081 A1* | 6/2011 | Romanov et al. | ............. | 700/255 |

FOREIGN PATENT DOCUMENTS

| | | |
|---|---|---|
| JP | 2004-185586 A | 7/2004 |
| JP | 2005-205028 A | 8/2005 |
| KR | 10-2009-0077547 A | 7/2009 |
| KR | 10-2009-0104393 A | 10/2009 |

OTHER PUBLICATIONS

International Search Report dated Aug. 25, 2011 issued in Application No. PCT/KR2010/008097.

* cited by examiner

*Primary Examiner* — James Trammell
*Assistant Examiner* — Sanjeev Malhotra
(74) *Attorney, Agent, or Firm* — Ked & Associates, LLP

(57) ABSTRACT

Disclosed are a robot cleaner and a method for controlling the same. The robot cleaner and method of the present invention involve dividing the whole area to be cleaned into sub-areas, and easily calculating a full path using travel paths in the sub-areas and connection points between sub-areas, and in the event the whole area to be cleaned is extended or an area which has not been cleaned is found, do not involve regenerating the whole map for cleaning, but rather easily updating the full path using the pre-stored travel path in the sub-areas and the connection points between sub-areas.

14 Claims, 4 Drawing Sheets

ROBOT CLEANER AND METHOD FOR CONTROLLING THE SAME

TECHNICAL FIELD

The present disclosure relates to a robot cleaner, and more particularly, a robot cleaner, capable of improving travel performance and cleaning performance by calculating a full path based on connection points between sub-areas or based on a travel path within each sub-area and the connection points, and a control method thereof.

BACKGROUND ART

Generally, a robot has been developed for an industrial use, and has managed some parts of factory automation. As the robot is applied to various fields recently, medical robots, space robots, home robots used at homes, etc. are being developed.

A representative of the home robots is a robot cleaner, a kind of home electronic appliance capable of performing a cleaning operation by sucking peripheral dust particles or foreign materials with autonomously moving on a predetermined region. This robot cleaner is provided with a rechargeable battery, and is provided with an obstacle sensor for avoiding an obstacle while moving.

In order to clean a whole area while moving by itself, the robot cleaner should generate a map for cleaning and determine clean areas, such as a cleaned area and an area to be cleaned, within the generated map for cleaning.

The robot cleaner should carry out a process of generating a travel path to avoid an obstacle and take the shortest distance while traveling within a space to be cleaned. Here, the robot cleaner according to the related art spends a longer time to calculate a full travel path or the shortest distance when the space to be cleaned increases (extends). Also, to calculate the full path and the shortest distance, the robot cleaner should be aware of a map for cleaning with respect to the whole area to be cleaned. This makes the robot cleaner equipped with a memory of a large capacity for storing the map for cleaning the whole area to be cleaned.

DISCLOSURE OF THE INVENTION

Therefore, to obviate those problems, an aspect of the detailed description is to provide a robot cleaner capable of dividing an area to be cleaned into a plurality of sub-areas and easily calculating (computing) a full path based on connection points between sub-areas or based on travel path in each sub-area and the connection points between the sub-areas, and a control method thereof.

Another aspect of the detailed description is to provide a robot cleaner capable of easily updating a full path based on a pre-stored travel path in the sub-areas and the connection points between the sub-areas, without regenerating a whole map for cleaning, when the whole area to be cleaned extends or an area which has not been cleaned is found.

To achieve these and other advantages and in accordance with the purpose of the present invention, as embodied and broadly described herein, there is provided a robot cleaner including a driving unit to drive at least one wheel to move the robot cleaner, a control unit to divide an area to be cleaned into a plurality of sub-areas so as to calculate a full path based on connection points between the sub-areas or based on a travel path within each sub-area and the connection points, the control unit controlling the driving unit, and a storage unit to store the travel path within each sub-area, the connection points between the sub-areas, and the full path.

A robot cleaner according to the detailed description may include a driving unit to drive at least one wheel to move the robot cleaner, a control unit to divide an area to be cleaned into a plurality of sub-areas so as to calculate a full path based on connection points between the sub-areas or based on a travel path within each sub-area and the connection points, the control unit controlling the driving unit, a storage unit to store the travel path within each sub-area, the connection points between the sub-areas, and the full path, an obstacle detection unit to detect an obstacle within the area to be cleaned, a position recognition unit having at least one sensor to recognize a position of the robot cleaner, a power source unit having a rechargeable power supply element to supply power into the robot cleaner, an input unit having at least one button to directly receive an input of a control command, and an output unit to output information related to at least one of the travel paths within the sub-areas, the connection points between the sub-areas and the full path.

In the robot cleaner according to the present disclosure, the control unit may calculate the full path by connecting the connection points, and controls the robot cleaner to travel or perform cleaning along the full path. The control unit may calculate the full path by connecting the travel paths within the sub-areas via the connection points and control the robot cleaner to travel or perform cleaning along the full path. Also, the control unit may generate a travel path from connection points with sub-areas adjacent to an extended area to be cleaned among the sub-areas stored in the sub-areas when the area to be cleaned extends.

In the robot cleaner according to the present disclosure, the control unit may include a connection point generating module to generate the connection points between the plurality of sub-areas, and a full path calculating module to calculate the full path by connecting the connection points. Here, the full path calculating module may linearly connect the connection points to calculate the full path.

The control unit may further include a travel path generating module to generate travel paths within the plurality of sub-areas, and the full path calculating module may connect the sub-areas using the travel paths and the connection points so as to calculate the full path.

The control unit may further include an area dividing module to divide the area to be cleaned into the plurality of sub-areas.

To achieve these and other advantages and in accordance with the purpose of the present invention, as embodied and broadly described herein, there is provided a method for controlling a robot cleaner including searching for an area to be cleaned, dividing the area to be cleaned into a plurality of sub-areas, generating travel paths within the sub-areas, respectively, generating connection points between the sub-areas, storing sub-area information including the travel paths within the sub-areas and the connection points between the sub-areas, and calculating a full path based on the connection points, or based on the travel paths within the sub-areas and the connection points. Here, the calculating of the full path may include calculating the full path by connecting the connection points. Also, the calculating of the full path may include calculating the full path by connecting the travel paths within the sub-areas via the connection points. The method may further include storing the calculated full path.

The method may further include generating a travel path within an extended area to be cleaned when the area to be cleaned extends, and adding the travel path within the extended area to be cleaned to the stored full path. Also, the method may further include searching for sub-areas adjacent to the extended area to be cleaned, and the generating of the travel path within the extended area to be cleaned may be performed to generate the travel path within the extended area to be cleaned from the connection points with the adjacent sub-areas.

ADVANTAGEOUS EFFECT

In accordance with a robot cleaner and a control method thereof according to the detailed description, a full path can be easily calculated based on pre-stored connection points between sub-areas or based on a travel path within each sub-area and the connection points. This may result in reduction of the number of calculation motion and a calculation time for calculating a travel path, and maintenance of optimal travel performance.

Also, in accordance with a robot cleaner and a control method thereof according to the detailed description, when the whole area to be cleaned extends or an area which has not been cleaned is found, a full path can be easily updated based on a travel path within each sub-area and connection points between the sub-areas. This may result in reduction of the number of calculation motion and calculation time for generating the whole map for cleaning, reduction of storage burden, maintenance of optimal travel performance, and improvement of cleaning performance and cleaning efficiency.

MODES FOR CARRYING OUT THE PREFERRED EMBODIMENTS

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Hereinafter, description will be given of a robot cleaner and a control method thereof with reference to the accompanying drawings.

Figure 1:
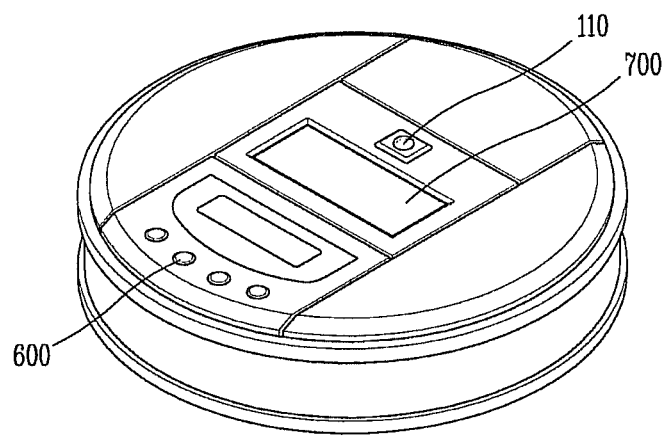
FIG. 1 is a perspective view schematically showing an appearance of a robot cleaner in accordance with this specification.
Figure 2:
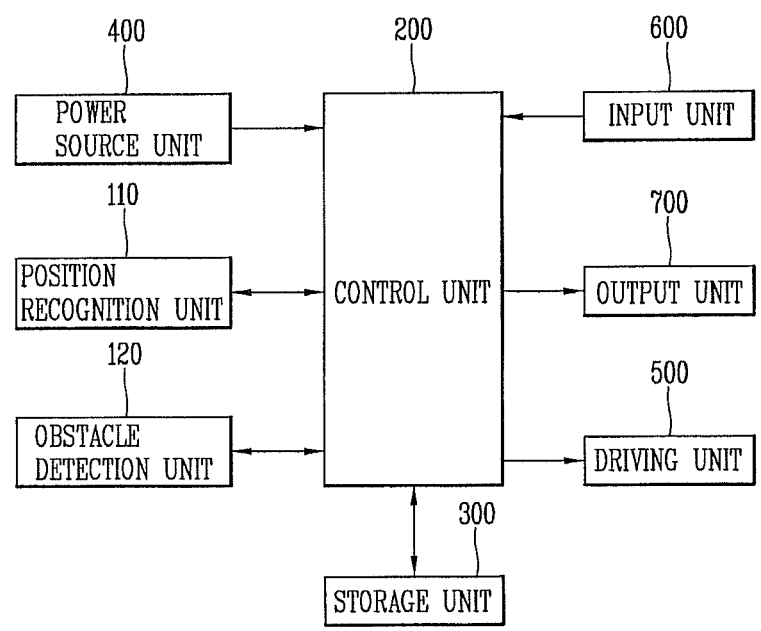
FIG. 2 is a block diagram schematically showing a configuration of the robot cleaner.

As shown in FIGS. 1 and 2, a robot cleaner according to the detailed description may include a driving unit 500 to drive at least one wheel to make the robot cleaner movable, a control unit 200 to divide an area to be cleaned into a plurality of sub-areas to calculate a full path based on connection points between the sub-areas or based on a travel path within each sub-area and the connection points, and control the driving unit 500, and a storage unit 300 to store the travel path within each sub-area, the connection points between the sub-areas, and the full path.

In the robot cleaner having the configuration, the control unit 200 may calculate the full path by connecting the travel paths within the sub-areas through the connection points, and control the robot cleaner to move or perform cleaning along the full path.

Figure 3:
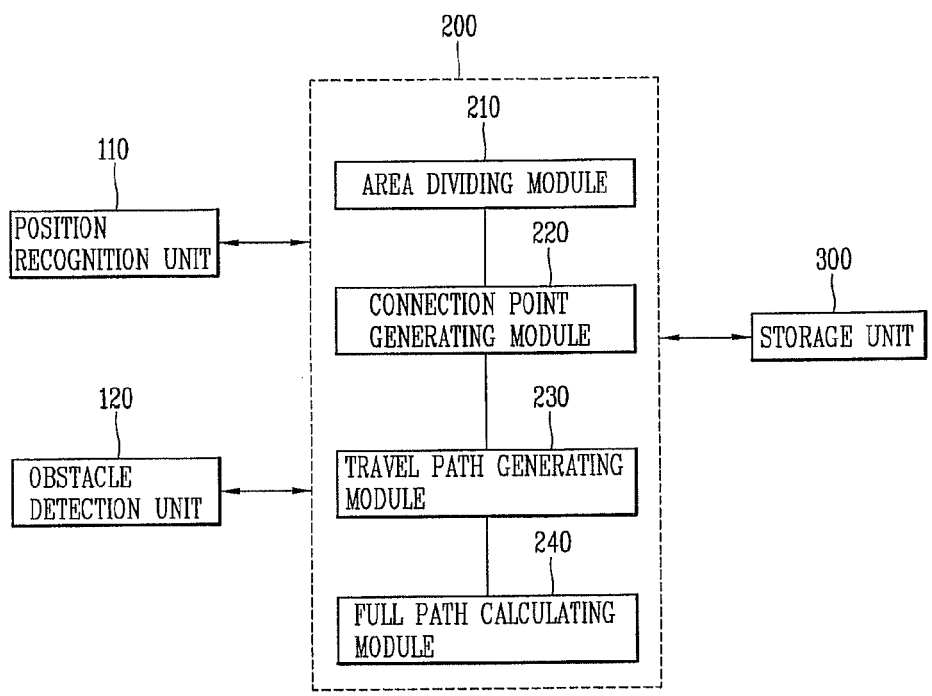
FIG. 3 is a block diagram schematically showing a detailed structure of a control unit shown in FIG. 2.

Referring to FIG. 3, the control unit 200 may include a connection point generating module 220 to generate the connection points between the plurality of sub-areas, and a full path calculating module 240 to calculate the full path by connecting the connection points. Here, the full path calculating module 240 may linearly connect the connection points so as to calculate the full path. Accordingly, the robot cleaner can travel faster between the sub-areas using the calculated full path.

The control unit 200 may further include a travel path generating module 230 to generate a travel path within each of the plurality of sub-areas. Here, the full path calculating module 240 may connect the sub-areas by using the travel paths generated by the travel path generating module 230 and the connection points generated by the connection point generating module 220, thereby calculating the full path. Consequently, the robot cleaner can be facilitated to travel between the sub-areas using the connection points, and also be allowed to travel or perform cleaning within the sub-areas along the travel paths. The full path calculating module 240 may also calculate the full path by connecting the travel paths, and thus the robot cleaner may travel or perform cleaning along the travel paths using the thusly-calculated full path. The travel path generating module 230 may generate a different travel path for each sub-area by several methods, for example, in a random manner, a spiral manner, a zigzag manner and the like.

The control unit 200 may further include an area dividing module 210 to divide the area to be cleaned into the plurality of sub-areas. The area dividing module 210 may divide the area to be cleaned into the plurality of sub-areas with a predetermined size or by varying an initial size into a different shape and size according to ambient environments, for example, obstacles and the like.

Figure 4:
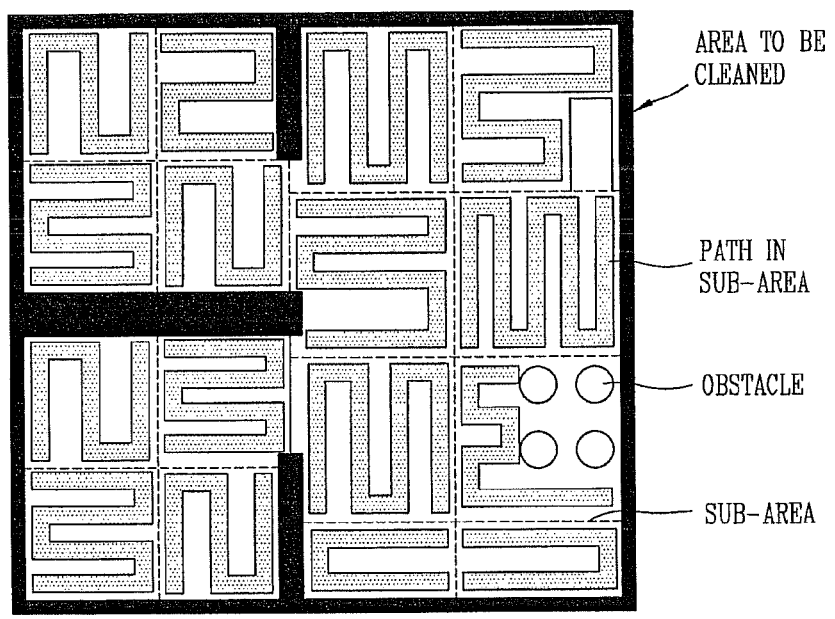
FIG. 4 is a view showing an operation of calculating a full path using travel paths within a plurality of sub-areas and connection points between the sub-areas.

Referring to FIG. 4, the robot cleaner may generate a map for cleaning by searching an area to be cleaned, and divide the area to be cleaned into a plurality of sub-areas. The control unit 200 may generate travel paths within the plurality of sub-areas, respectively, and connection points between the sub-areas. Also, the control unit 200 may connect the travel paths within the sub-areas via the connection points to easily calculate a full path. The robot cleaner may accordingly travel or perform cleaning along the calculated full path.

In the robot cleaner having the configuration, the control unit 200 may calculate the full path by connecting the connection points and control the robot cleaner to travel or perform cleaning along the full path.

Figure 5:
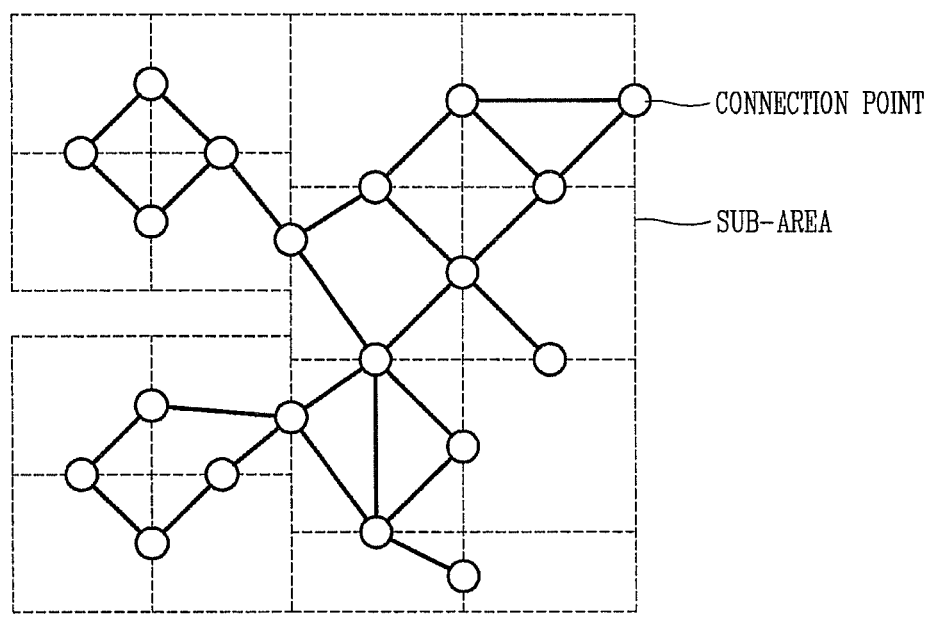
FIG. 5 is a view showing an operation of calculating a full path using connection points between a plurality of sub-areas, in accordance with this specification.

Referring to FIG. 5, the robot cleaner may generate a map for cleaning by searching an area to be cleaned, and divide the area to be cleaned into a plurality of sub-areas. Here, the plurality of sub-areas may be connected to adjacent sub-areas via the plurality of connection points. The control unit 200 may connect the shortest path between the connection points and connect the shortest paths between the connection points, thereby calculating a full path. The control unit 200 may send a driving signal to the driving unit 500, thus to control the robot cleaner to move along the calculated full path or control the robot cleaner to move to a target sub-area along the calculated full path and clean the corresponding sub-area. That is, when the robot cleaner desires to move from the current position to another sub-area, if it calculates only a path from the current position to a connection point between a sub-area to which the current position belongs and an adjacent sub-area, the control unit 200 may generate a full path up to a sub-area, to which the robot cleaner desires to move.

Also, in the robot cleaner having the configuration, when an area to be cleaned extends, the control unit 200 may generate a travel path from connection point with sub-areas, which are adjacent to the extended area to be cleaned. When the area to be cleaned extends, for example, an area which has not been cleaned is found, the control unit 200 may divide the extended area to be cleaned into sub-areas, or generate a travel path within the whole extended area to be cleaned and then connect the generated travel path to a connection point with an adjacent sub-area. Afterwards, the control unit 200 may add the travel path for the extended area to be cleaned to the pre-stored full path, thereby easily calculating a modified full path.

Referring back to FIG. 2, the robot cleaner may further include an obstacle detection unit 120 to detect an obstacle within the area to be cleaned, and a position recognition unit 110 having at least one sensor to recognize a position of the robot cleaner.

The position recognition unit 110 may be implemented as at least one of an optical flow sensor for acquiring bottom image information using light, an encoder connected to a wheel motor for driving the wheels of the robot cleaner so as to detect speed, a gyro sensor for detecting a rotation speed of the robot cleaner. Also, the position recognition unit 110 may be implemented as a camera to capture a front or top image to determine an absolute position of the robot cleaner.

The obstacle detection unit 120 may be implemented as a distance sensor, such as a supersonic sensor, an infrared sensor and a Radio Frequency (RF) sensor, which receives a signal in response to a signal sent thereby to detect a position of an obstacle and a distance from the obstacle, an impact sensor to sense an obstacle in response to an impact against the obstacle.

The robot cleaner may further include an input unit 600 having at least one button to directly receive a control command. For example, the input unit 600 may include at least one input button of a check button for inputting a command to check the area to be cleaned, the map for cleaning, the sub-area, the connection point, the travel path and the full path, a setting button for inputting a setting command, a reset button for inputting a reset command, a delete button for inputting a command to delete set areas, a cleaning start button for inputting a command to start cleaning based on the set areas, and a stop button for inputting a command to stop the cleaning operation.

The robot cleaner may further include an output unit 700 to output at least one information of the travel path within the sub-areas, the connection points between the sub-areas, and the full path. The output unit 700 may output information, which is detected or recognized by the obstacle detection unit 120 or the position recognition unit 110. The output unit 700 may display the area to be cleaned, the map for cleaning generated by the control unit 300, the plurality of sub-areas in which the area to be cleaned is divided, the connection points between the sub-areas, the travel paths and the full path. Also, the output unit 700 may further display state information related to a current state of each unit configuring the robot cleaner and a current cleaned state and the like. The output unit 700 may be implemented as one of Light Emitting Diode (LED), Liquid Crystal Display (LCD), Plasma Display Panel (PDP) and Organic Light Emitting Diode (OLED). Here, the input unit 600 and the output unit 700 may have a form of touch screen which supports both input and output functions.

The robot cleaner may further include a power source unit 400 having a rechargeable power supply element to supply power into the robot cleaner. The power supply unit 400 may supply operating power for allowing the robot cleaner to travel and perform cleaning. When a capacity level of a battery mounted inside is low, the power source unit 400 may be recharged with charging current from a charger.

Figure 6:
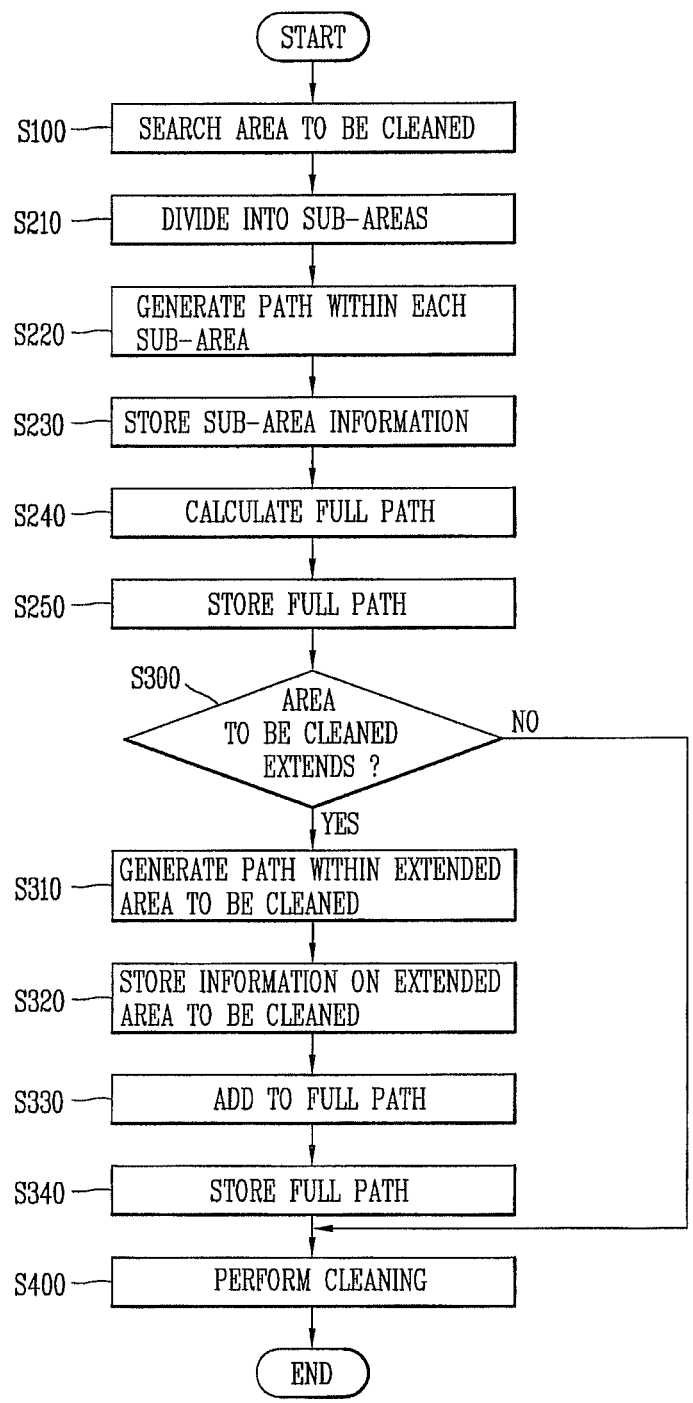
FIG. 6 is a flowchart schematically showing a method for controlling a robot cleaner in accordance with this specification.

Referring to FIG. 6, a method for controlling a robot cleaner according to the detailed description may include searching for (finding) an area to be cleaned (S100), dividing the area to be cleaned into a plurality of sub-areas (S210), generating a travel path within each sub-area (S220), generating connection points between the sub-areas (not shown), storing sub-area information including the travel path within each sub-area and the connection points between the sub-areas (S230), and calculating a full path based on the connection points, or based on the travel path within each sub-area and the connection points (S240). The control method may further include storing the calculated full path (S250). Hereinafter, the configuration of the apparatus will be understood with reference to FIGS. 1 and 2.

In the control method for the robot cleaner, the step of calculating the full path (S240) may include a process of calculating the full path by connecting the connection points.

Referring to FIG. 5, the robot cleaner may generate a map for cleaning by searching an area to be cleaned, and divide the area to be cleaned into a plurality of sub-areas. Here, the plurality of sub-areas may be connected to adjacent sub-areas via the plurality of connection points. According to the control method, the connection points are connected via the shortest path and the shortest paths between the connection points are connected, thereby calculating a full path. The robot cleaner is controlled to move along the calculated full path, or move to a target sub-area along the calculated full path and clean the corresponding sub-area. That is, when the robot cleaner desires to move from the current position to another sub-area, if only a path from the current position to a connection point between a sub-area to which the current position belongs and an adjacent sub-area is calculated, a full path from the current position up to a sub-area, to which the robot cleaner desires to move, can be generated.

In the control method for the robot cleaner, the step of calculating the full path (S240) may include a process of calculating the full path by connecting the travel paths within the sub-areas via the connection points.

Referring back to FIG. 4, the robot cleaner searches for an area to be cleaned to generate a map for cleaning, and divide the area to be cleaned into a plurality of sub-areas. Also, in the control method, a travel path within each of the plurality of sub-areas is generated, and connection points between adjacent sub-areas are generated. According to the control method, the travel paths within the sub-areas are connected via the connection points, which facilitates calculation of the full path. The robot cleaner then moves or perform cleaning along the calculated full path.

The control method for the robot cleaner may further include generating a travel path within an extended area to be cleaned when the area to be cleaned extends (S310), and adding the travel path within the extended area to be cleaned to the stored full path (S330). Also, the control method may further include searching for sub-areas adjacent to the extended area to be cleaned (not shown). In the step of generating the travel path within the extended area to be cleaned (S310), the travel path within the extended area to be cleaned is generated from the connection points with the adjacent sub-areas. The control method may further include storing information related to the extended area including the travel path and the connection points.

According to the control method, when the area to be cleaned extends, the travel path is generated from the connection points with sub-areas adjacent to the extended area to be cleaned, among the sub-areas stored in the storage unit. When the area to be cleaned extends, for example, an area which has not been cleaned is found, the extended area to be cleaned is divided into sub-areas, or a travel path within the whole extended area to be cleaned is generated and then the generated travel path is connected to a connection point with an adjacent sub-area. Afterwards, the travel path for the extended area to be cleaned is added to the pre-stored full path, thereby easily calculating a modified full path.

In accordance with the robot cleaner and the control method thereof, cleaning is performed in a cell (sub-area) unit, connection points with adjacent sub-areas within the sub-areas, and travel paths between the connection points are stored. Here, the travel path is the shortest path between the connection points, a searched travel path, or a travel path according to a method of performing cleaning. Afterwards, when an area to be cleaned extends, only a travel path up to a connection point with the stored sub-area is generated, and a path after the generated travel path is connected to a pre-stored path. Accordingly, travel paths, on which the robot cleaner has successfully moved and performed cleaning, can be continuously stored and updated, which may result in reduction of calculation time and improvement of travel performance.

As described above, in accordance with a robot cleaner and a control method thereof, a whole area to be cleaned may be divided into sub-areas, and a full path may be easily calculated using travel paths within the sub-areas and connection points between the sub-areas. When the whole area to be cleaned extends or a non-cleaned area is found, the full path can be easily updated using the travel paths within the sub-areas and the connection points between the sub-areas, without regenerating the full map for cleaning, which may result in reduction of the number of calculation motion and calculation time for generating the full path or the full map for cleaning, reduction of a storage burden, maintenance of optimal travel performance, and improvement cleaning performance and cleaning efficiency.

The invention claimed is:

1. A robot cleaner to divide an area to be cleaned into a plurality, of sub-areas, adjacent sub-areas having a boundary, formed there between, each boundary having at least one connection point located thereon, and to perform cleaning per a unit area, wherein the unit area is one of the plurality of sub-areas, the robot cleaner comprising:
    a driving unit to drive at least one wheel to move the robot cleaner;
    a storage unit to store connection points between a plurality of the sub-areas one and at least one travel path within a plurality of the sub-areas respectively, wherein the at least one travel path is generated by connecting the respective connection points; and
    a control unit to control the driving unit so as to move the robot cleaner along a full path from a current position to a target sub-area, wherein the control unit is configured to:
        divide the area into the plurality of the sub-areas calculate the full path based on a first path from the current position to one of the connection points of the sub area to which the current position belongs and a second path connecting the at least one travel path, wherein the full path is formed by adding the first path to the second path.

2. The robot cleaner of claim 1, wherein the control unit controls the robot cleaner to travel or perform cleaning along the full path.

3. The robot cleaner of claim 1, wherein the travel path is a shortest path connecting the connection points of the plurality of sub-area respectively.

4. The robot cleaner of claim 1, wherein the control unit generates an additional travel path from at least one connection point on a boundary of at least one sub-area adjacent to an extended area to be cleaned among the plurality of the sub-areas in response to when the area extends, wherein the control unit adds the generated additional travel path to the calculated full path.

5. The robot cleaner of claim 1, wherein the control unit comprises:
    a connection point generating module to generate the connection points; and
    a full path calculating module to calculate the full path by connecting two or more connection points.

6. The robot cleaner of claim 5, wherein the full path calculating module linearly connects connection points to calculate the full path.

7. The robot cleaner of claim 5, wherein the control unit further comprises:
    a travel path generating module to generate the plurality of travel paths within the plurality of sub-areas,
    wherein the full path calculating module connects the plurality of sub-areas using the plurality of travel paths and the connection points to calculate the full path.

8. The robot cleaner of claim 7, wherein the control unit further comprises:
    an area dividing module to divide the area into the plurality of sub-areas.

9. The robot cleaner of claim 1, further comprising:
    an obstacle detection unit to detect an obstacle within the area to be cleaned;
    a position recognition unit having at least one sensor to recognize a position of the robot cleaner;
    a power source unit having a rechargeable power supply element to supply power into the robot cleaner;
    an input unit having at least one button to directly receive an input of a control command; and
    an output unit to output information related to the plurality of the travel paths within the plurality of the sub-areas, the at least one of the connection points and the full path.

10. A method for controlling a robot cleaner to divide an area to be cleaned into a plurality, of sub-areas, adjacent sub-areas having a boundary, formed there between, each boundary having at least one connection point located thereon, and to perform cleaning per a unit area, wherein the unit area is one of the plurality of sub-areas, the method comprising:
    searching for the area to be cleaned;

dividing the area to be cleaned into a plurality of the sub-areas;

generating the connection points;

generating at least one travel path within a plurality of the sub-areas respectively, wherein the at least one travel path is generated by connecting the respective connection points;

storing sub-area information including at least one of the connection points and at least one travel paths;

calculating a full path based on a first path from a current position to one of the at least one connection points of the sub-area to which the current position belongs and a second path connecting the at least one travel path, wherein the full path is formed by adding the first path to the second path; and controlling a driving unit to drive at least one wheel to move the robot cleaner along the full path from the current position to a target sub-area.

11. The method of claim 10, wherein the travel path is a shortest path connecting the connection points of the plurality of sub-area respectively.

12. The method of claim 10, further comprising:
storing the calculated full path.

13. The method of claim 12, further comprising:
generating an additional travel path within an extended area to be cleaned in response to when the area extends; and adding the additional travel path within the extended area to the calculated full path.

14. The method of claim 13, further comprising:
searching for at least one sub-area adjacent to the extended area to be cleaned, wherein the generating of the additional travel path is formed from a connection point of at least one sub-area adjacent to the extended area to be cleaned among the plurality of the sub-areas.

* * * * *